United States Patent
Smith et al.

(10) Patent No.: US 10,001,222 B2
(45) Date of Patent: *Jun. 19, 2018

(54) PRESSURE RELIEF MODULE

(71) Applicant: Carlisle Fluid Technologies, Inc., Charlotte, NC (US)

(72) Inventors: Alan Smith, Bournemouth (GB); Philip Jeremy Martin, Wareham (GB)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/601,841

(22) Filed: May 22, 2017

(65) Prior Publication Data

US 2017/0314693 A1 Nov. 2, 2017

Related U.S. Application Data

(63) Continuation of application No. 14/768,816, filed as application No. PCT/EP2014/052544 on Feb. 10, 2014, now Pat. No. 9,657,857.

(30) Foreign Application Priority Data

Feb. 19, 2013 (GB) .................................. 1302824.6

(51) Int. Cl.
*B05B 17/00* (2006.01)
*F16K 17/04* (2006.01)
(Continued)

(52) U.S. Cl.
CPC ................ *F16K 17/04* (2013.01); *B05B 1/00* (2013.01); *B05B 1/3026* (2013.01);
(Continued)

(58) Field of Classification Search
CPC ......... F16K 17/04; F16K 15/063; B05B 9/04; B05B 12/087; B05B 1/00; B05B 9/0403; B05B 1/3046; B05B 1/3026
(Continued)

(56) References Cited

U.S. PATENT DOCUMENTS 2,727,786 A 12/1955 Bede
3,018,968 A 1/1962 Levey
(Continued)

FOREIGN PATENT DOCUMENTS

DE 2346698 B2 10/1975
EP 1084760 A2 3/2001
JP H6-3472 U 1/1994

OTHER PUBLICATIONS

CN Office Action; Application No. CN 201480009338.1; dated Nov. 4, 2016; 5 pages.
(Continued)

*Primary Examiner* — Steven J Ganey
(74) *Attorney, Agent, or Firm* — Fletcher Yoder, P.C.

(57) ABSTRACT

A paint circulating system 10 and a pressure relief module 40 utilized therein are described. The paint circulating system 10 comprises a pressurized paint supply pipeline 22, a tank return pipeline 34 and a pressure relief module 40. The pressure relief module 40 comprises: a first flow chamber 65 through which pressurized paint is provided to said supply pipeline 22; a second flow chamber 69 through which paint returns to said tank return pipeline 34; an orifice 42 interconnecting said first and second flow chambers; and a valve member 46 biased towards the orifice so as to block said orifice. The valve member 46 is moveable in response to a pressure in said first flow chamber 65 exceeding a predetermined relief pressure so as to displace said valve member 46 to open said orifice 42. This allows paint to flow
(Continued)

from said first flow chamber 65 into said second flow chamber 69, preventing failure occurring in the paint circulating system 10.

19 Claims, 4 Drawing Sheets

(51) Int. Cl.
  *B05B 1/30*  (2006.01)
  *B05B 9/04*  (2006.01)
  *B05B 1/00*  (2006.01)
  *F16K 15/06*  (2006.01)
  *B05B 12/08*  (2006.01)
  *B05D 1/02*  (2006.01)

(52) U.S. Cl.
  CPC .............. *B05B 1/3046* (2013.01); *B05B 9/04* (2013.01); *B05B 9/0403* (2013.01); *B05B 12/087* (2013.01); *B05D 1/02* (2013.01); *F16K 15/063* (2013.01)

(58) Field of Classification Search
  USPC ............ 239/1, 124, 125, 127, 525, 569, 583
  See application file for complete search history.

(56) References Cited

U.S. PATENT DOCUMENTS

| | | | | |
|---|---|---|---|---|
| 3,023,968 | A | * | 3/1962 | Mitchell ............... B05B 7/2486 239/125 |
| 3,720,373 | A | | 3/1973 | Mitchell |
| 6,179,223 | B1 | | 1/2001 | Sherman et al. |
| 9,657,857 | B2 | * | 5/2017 | Smith ....................... B05B 9/04 |

OTHER PUBLICATIONS

PCT International Preliminary Report on Patentability; Application No. PCT/EP2014/052544; dated Jul. 5, 2015.

Japanese Office Action for JP Application No. 2015-557390 dated Aug. 15, 2017, 7 pgs.

\* cited by examiner

PRESSURE RELIEF MODULE

CROSS REFERENCE TO RELATED APPLICATIONS

This application is a continuation of U.S. patent application Ser. No. 14/768,816, entitled "Pressure Relief Module", filed Aug. 19, 2015, which claims priority to PCT Application No. PCT/EP2014/052544 entitled "Pressure Relief Module", filed Feb. 10, 2014, which claims priority from British Application No. 1302824.6 entitled "Pressure Relief Module", filed Feb. 19, 2013, the disclosures of which are hereby incorporated by reference herein in their entireties.

The present invention relates to a pressure relief module and a paint circulating system including a pressure relief module. More particularly, the present invention relates to a pressure relief valve for a fluid circulating system and to a paint circulating system comprising a pressurised paint supply pipeline, a tank return pipeline and a pressure relief valve.

When working with pressurised liquid flows, such as in automotive paint finishing facilities, it is important to provide relief systems, designed to intentionally fail, analogous to a fuse, if the pressure within the facility increases beyond safe predetermined levels.

Pressure increases may occur naturally due to blockages within the pipelines pumping the pressurised liquids, or may be inadvertently created due to incorrect closing of a valve etc. Without a mechanism to release the pressure, unpredictable, expensive and potentially dangerous failure can occur within the pipelines and the pumping equipment.

To address this, rupture discs are often used to provide a form of rudimentary pressure management. These discs are installed in the pipelines and are designed to fail when a predetermined pressure limit is exceeded. Once this limit is reached, the disc ruptures and diverts paint into a run-off pipeline and back to the supply tank. Although a solution, such discs need to be replaced after each failure. There is also the problem that the separate run-off pipeline must be cleaned after use to prevent aggregation of dried paint.

The present invention aims to alleviate these issues by providing an improved paint circulating system with pressure relief module.

According to a first aspect of the present invention, there is provided a pressure relief module for a fluid circulating system, said module comprising a housing, said housing comprising a supply flow inlet port for receiving a pressurised supply fluid flow; a supply flow outlet port for supplying the pressurised fluid flow; a return flow inlet port for receiving a low pressure return fluid flow; and a return flow outlet port for supplying the low pressure return fluid flow; a first flow chamber connecting the supply flow inlet port to the supply flow outlet port; a second flow chamber connecting the return flow inlet port to the return flow outlet port; and pressure relief means configured to divert at least a portion of the supply fluid flow from the first flow chamber into the second flow chamber when the pressure of the supply fluid flow exceeds a threshold value.

Advantageously, the first and second flow chambers share a common separating wall. Within the common separating wall there is an orifice, which interconnects the first flow chamber to the second flow chamber. A valve member, biased against the orifice, seals the orifice in normal operating conditions and is arranged to open the valve (the valve member moves away from the orifice) when the pressure of the supply fluid flow exceeds a threshold value.

Generally, the first flow chamber and the second flow chamber are orthogonally arranged within the housing. This allows for a compact arrangement of the housing and is easier to construct than if the first and second flow chambers are arranged parallel. This is because the common separating wall is minimised in a perpendicular (orthogonal) arrangement, allowing the position of the orifice to be more easily controlled.

According to a second aspect of the present invention there is provided a paint circulating system comprising a pressurised paint supply pipeline, a tank return pipeline and a pressure relief module, wherein the pressure relief module comprises: a first flow chamber through which pressurised paint is provided to said supply pipeline; a second flow chamber through which paint returns to said tank return pipeline; an orifice interconnecting said first and second flow chambers; and a valve member biased towards the orifice so as to block said orifice, and wherein said valve member is moveable in response to a pressure in said first flow chamber exceeding a predetermined relief pressure so as to displace said valve member to open said orifice to allow paint to flow from said first flow chamber into said second flow chamber.

In an embodiment, the pressure relief module comprises a housing such that the first flow chamber and the second flow chamber each define a passageway therein. Such an arrangement allows the pressure relief valve to divert or vent paint from the pressurised paint pipeline entering the housing directly towards and into the tank return pipeline, eliminating the need for a separate pipeline for overflow or relief paint and ensuring the operating time lost for the facility due to an exceeded pressure event is minimised or eliminated.

Advantageously, the first flow chamber and the second flow chamber are arranged perpendicularly to one another within the housing.

Preferably, the first flow chamber is arranged adjacent to the second flow chamber within the housing.

In embodiments of the invention, the orifice of the valve is located in a common wall separating the first flow chamber and the second flow chamber.

Generally, the system also comprises a tank for storing paint for supply to the system and a pump for pumping paint from the tank and to the pressurised paint supply pipeline, wherein the tank return line returns paint to the tank. A plurality of sprayers may also be provided downstream of the pressurised paint supply pipeline to apply the paint to automobiles and the like.

Particular embodiments of the invention are illustrated in the accompanying drawings in which.

Figure 3:
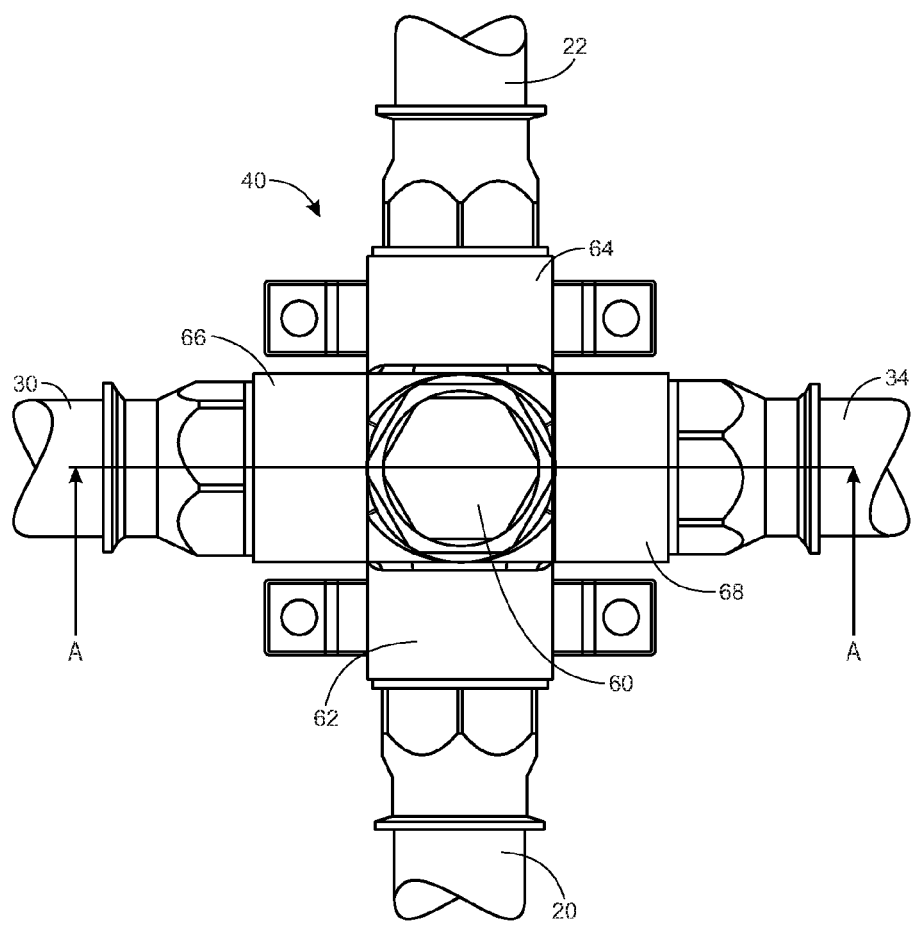
FIG. 3 is a schematic top view representation of the pressure relief module shown in FIGS. 1 and 2.
Figure 4A:
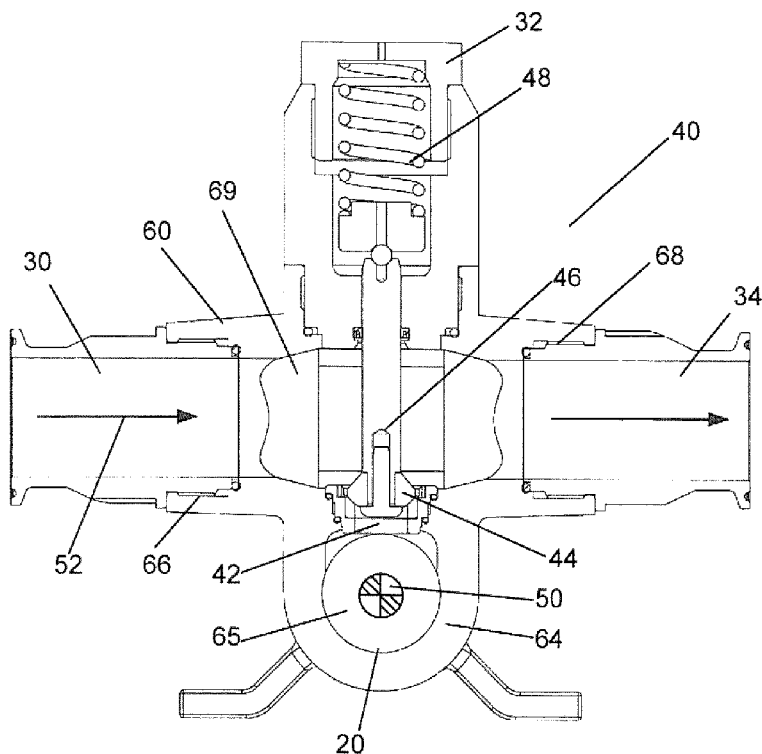
Figure 4B:
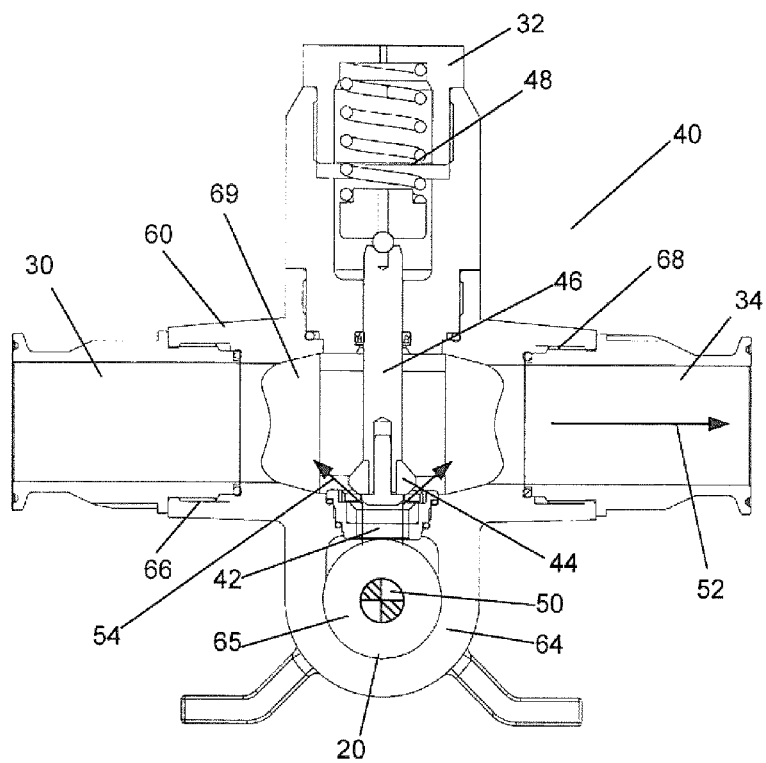

FIG. 4a is cross sectional view along the line A-A of the pressure relief module shown in FIG. 3 in the condition shown in FIG. 1 when the fluid flowing through the system and the module is below a set pressure; and FIG. 4b is a cross sectional view of the pressure relief valve shown in FIG. 4a and the condition shown in FIG. 2 when the fluid flowing through the system and the module is above a set pressure.

Figure 1:
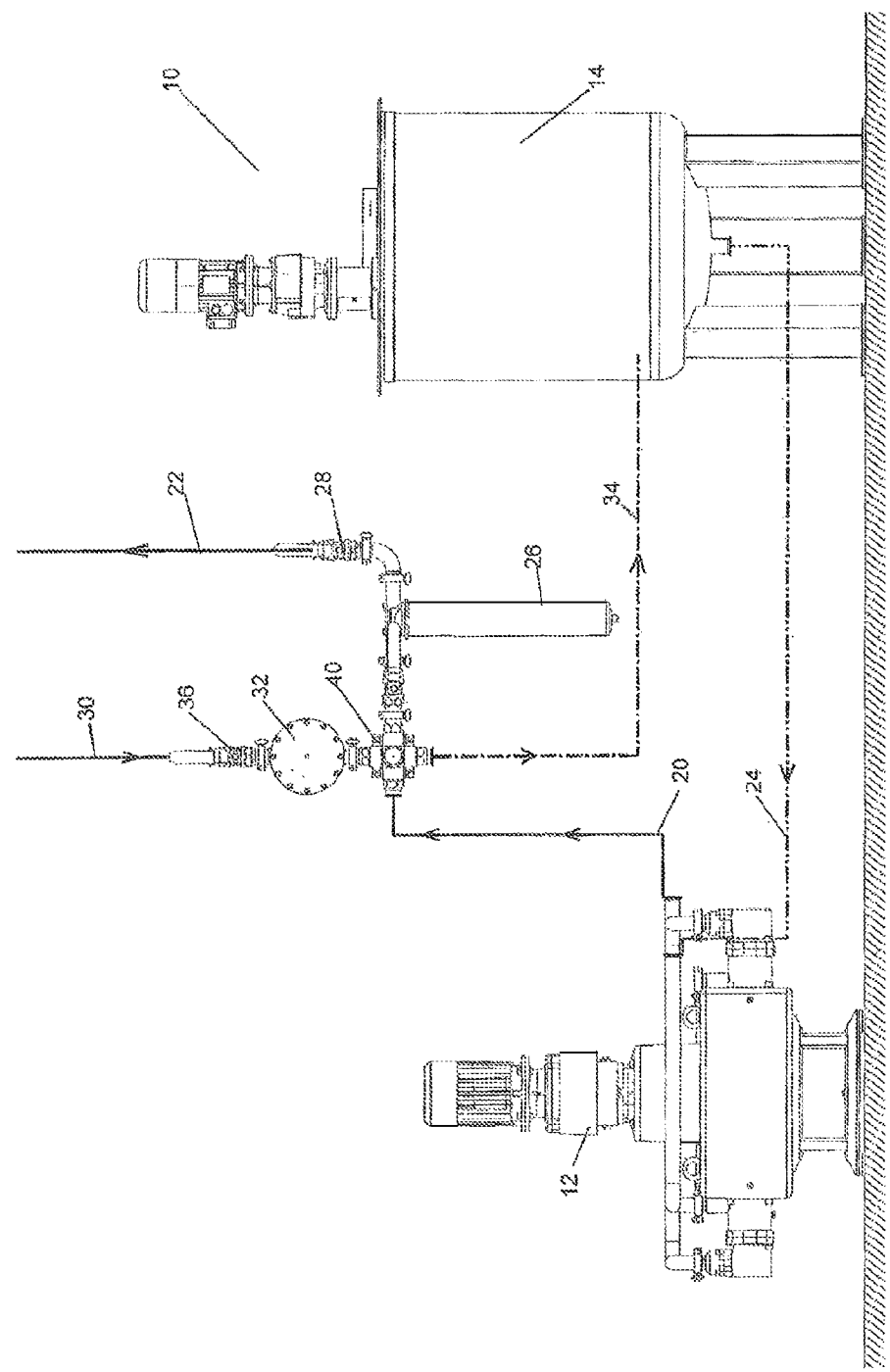
FIG. 1 is a schematic representation of a paint circulation system with a pressure relief module according to the present invention when the system is operating in a normal condition.

FIG. 1 shows a paint circulation system 10 for supplying paint to a plurality of paint sprayers (not shown). The system 10 comprises a pump 12 for pumping paint from a mix tank 14 and around the system 10. The pump 12 is typically an electric variable speed pump, although alternative equivalent pumps may be used. The mix tank 14 is a storage tank for holding paint or other liquid prior to it being pumped (circulated) around the system 10 by the pump 12. When the liquid is paint, it is important to ensure that the paint is continuously pumped (circulated) to prevent sedimentation within the pipework and equipment.

The pump supplies pressurised paint around the system via a plurality of pipelines 20, 22, 24. In use, paint is received by the pump 12 from the mix-tank 14 via paint supply pipeline 24 (shown as a dash-dot-dot line in FIG. 1). The pump displaces the paint to a pre-set level, for example 10 liters per minute. The paint is then directed around the system to the paint sprayers (not shown) via pump outlet pipeline 20 and main spray pipeline 22 (shown as solid lines in FIG. 1). Optionally, the main spray pipeline 22 may contain a flow filter 26 to remove particulates from the pressurised paint flow and a ball stop valve 28 through which the paint flows.

The paint is delivered to the sprayers and circulated back through a return pipeline 30. A back pressure regulator 32 is provided in the return pipeline 30 that acts to set and maintain the pressure of the paint upstream of the regulator 32, whilst paint downstream of the back pressure regulator 32 is unpressurised.

Downstream of the back pressure regulator 32, the return pipeline 30 enters a pressure relief module 40. The pressure relief module 40 includes a first flow chamber, or passageway for the paint, that connects the return pipeline 30 (shown as a solid line in FIG. 1) to the tank return pipeline 34 (shown as a dash-dot line in FIG. 1). Additionally, a second flow chamber, or passageway for paint, connects the pump outlet pipeline 20 to the main spray pipeline 22. Furthermore, the pressure relief module 40 has an orifice that interconnects the first and second flow chambers, allowing paint flowing from the pump outlet pipeline 20 into the main spray pipeline 22 to be diverted into the tank return pipeline 34. Around the orifice is a seat which cooperates with a valve member, which is normally biased against the seat, to block the orifice. When the pressure of paint in the first flow chamber (from the pump outlet pipeline 20 to the main spray pipeline 22) exceeds a preset value, the pressure overcomes the biasing force on the valve member to lift it away from the seat so as to open the orifice. This allows paint to flow from the first flow chamber to the second flow chamber i.e. from the pump outlet pipeline 20 into the tank return pipeline 34. In the example shown, the preset value is 21 bar (2,100,000 Pa). The operation of the pressure relief module will be described in greater detail with relation to FIGS. 3, 4a and 4b below.

Optionally, within the return pipeline is a second ball stop valve 36 positioned upstream of the back pressure regulator 32. This valve 36, with associated valve 28 may be used to isolate the paint sprayers (not shown) from the pump system.

Figure 2:
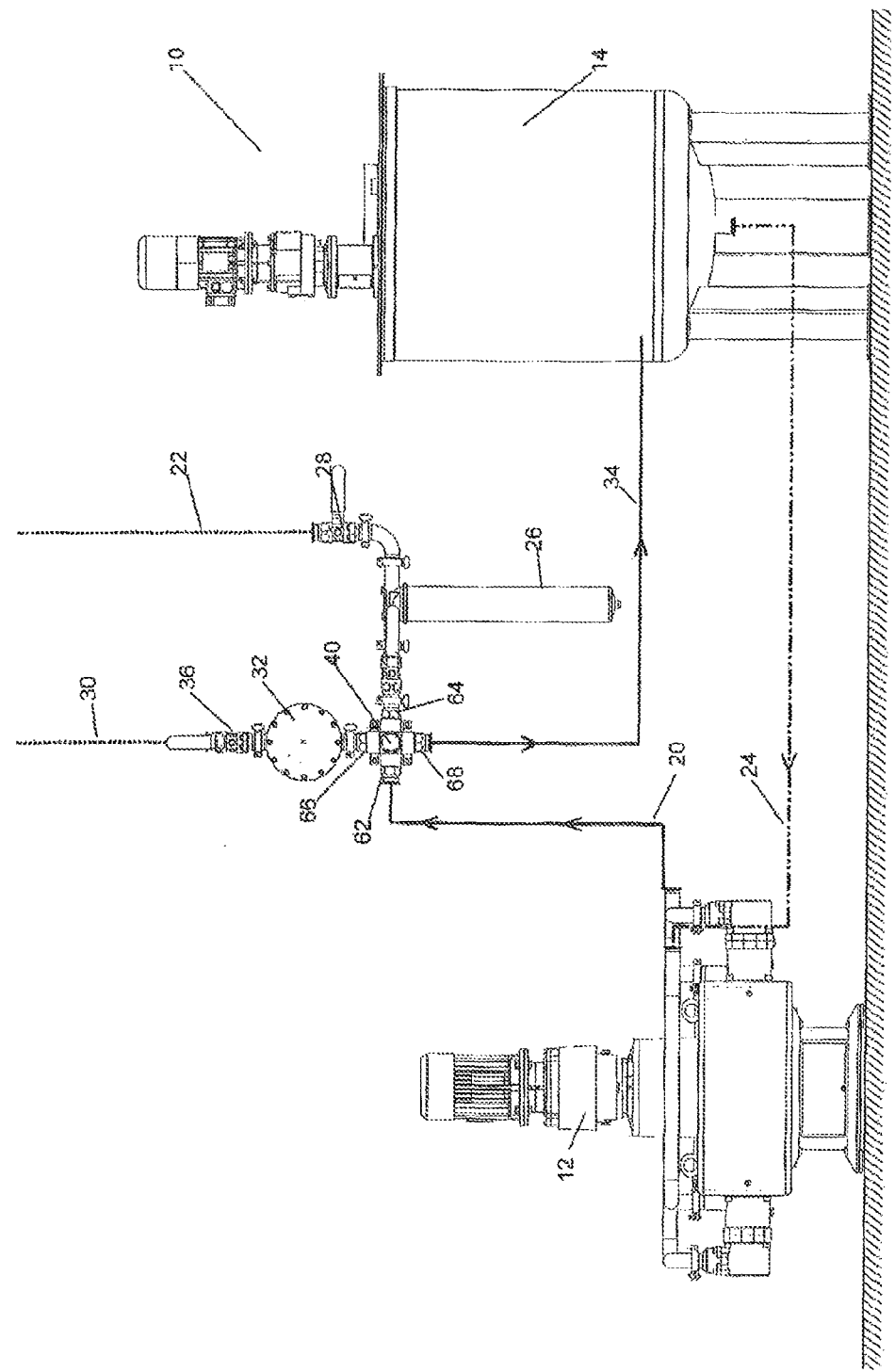
FIG. 2 is a schematic representation of the paint circulation system shown in FIG. 1 when the system is operating in a fault condition.

FIG. 2 shows the system in a fault mode. Such a scenario may occur when a blockage forms within the pipelines or filter 26 or may also occur in the event of human error, for example ball valve 28 being incorrectly closed. The latter example is shown in FIG. 2. Such a blockage may occur at any point within the pressurised flow line. In the event of a fault, paint is no longer free to flow around the system.

As the flow of paint around the system is prevented, once a blockage (such as an incorrectly or inadvertently closed valve 28) has occurred, the pressure of the paint within the pump outlet pipeline 20 increases. In the example shown, the paint within the pump outlet pipeline 20 (shown as a solid line in FIG. 2) has exceeded a preset pressure of the pressure relief valve 40, e.g. 21 bar (2,100,000 Pa). This causes the valve member in the pressure relief module 40 to open, diverting paint from the pump outlet pipeline 20 into the tank return pipeline 34 (now shown as a solid line in FIG. 2). This diversion prevents the pressure within the pump outlet pipeline 20 from reaching a value high enough to burst the pipeline 20 or to cause damage to the pump 12, or other components. With the diversion in place, the flow of paint through the main spray pipeline 22 and the return pipeline 30 (both shown as dotted lines in FIG. 2) is reduced or prevented.

The use of the pressure relief module 40 also removes the need to use additional replaceable pressure relief systems such as rupture discs or the like. Additionally, by diverting paint from the high pressure pump outlet pipeline 20 directly into the tank return pipeline 34 (rather than by using a dedicated relief pipeline) no pipelines require cleaning after a fault. This minimises the downtime of the system after a fault condition.

FIG. 3 shows a schematic top view representation of the pressure relief module shown in FIGS. 1 and 2. FIGS. 4a and 4b additionally show cross-sectional views of the pressure relief module 40 of FIG. 3, taken along the line A-A, in normal conditions (FIG. 4a) and fault conditions (FIG. 4b). The pressure relief module 40 has a housing 60 with a supply flow inlet port 62 for receiving a pressurised supply fluid flow from the pump outlet pipeline 20 and a supply flow outlet port 64 for supplying the pressurised fluid flow to the main spray pipeline 22. The supply flow inlet port 62 and the supply flow outlet port 64 are connected by a first flow chamber 65 through which the paint flows. Additionally, the pressure relief module 40 has a return flow inlet port 66 for receiving a low pressure return fluid flow from the return pipeline 30 and a return flow supply port 68 for supplying a low pressure return fluid flow to the tank return pipeline 34. Similarly, the return flow inlet port 66 and the return flow outlet port 68 are connected by a second flow chamber 69 through which paint flows from the return pipeline 30 to the tank return pipeline 34.

Where the first and second flow chambers 65, 69 are in closest proximity (i.e. where they cross in this example) they share a common separating wall. The pressure relief module contains an orifice 42 located in the common separating wall. The orifice 42 is provided with a valve seat 44 against which a valve member 46 is biased by a valve spring 48. The orifice 42 interconnects the first flow chamber to the second flow chamber 69 when the preset pressure of the pressure relief module 40 is exceeded such that the valve member 46 lifts off the valve seat 44.

In normal use (FIG. 4a), pressurised paint 50 is free to flow through the first flow chamber 65 from the pump outlet pipeline 20 to the main spray pipeline 22. Additionally, return low pressure paint 52 flows through the second flow chamber 69 from the return pipeline 30 to the tank return pipeline 34. In the event that the pressure of the paint 50 increases beyond the setpoint pressure of the pressure relief module 40 (such as during a fault), the pressure of the paint pushes against the valve seat 44, urging the valve member 46 away from the orifice 42 against the force of the biasing valve spring 48. As the orifice 42 is no longer sealed by the valve seat 44, high pressure paint 54 is free to pass through the orifice 42 and to enter the second flow chamber 69 and into the tank return pipeline 34.

In the examples shown, the first and second flow chambers 65, 69 are substantially orthogonally arranged within the housing to allow the housing to be as compact as possible. However, alternative arrangements such as parallel first and second flow chambers or curved flow chambers may be envisaged.

The invention claimed is:

1. A pressure relief module for a paint circulating system, comprising:
   a first flow chamber;
   a second flow chamber;
   an orifice that interconnects the first flow chamber to the second flow chamber;
   a valve member biased against the orifice, wherein when a pressure of a pressurized supply of paint exceeds a threshold value, the valve member moves away from the orifice to divert at least a portion of the pressurized supply of paint from the first flow chamber into the second flow chamber; and
   a single piece housing comprising the first flow chamber, the second flow chamber, and the valve member.

2. The pressure relief module of claim 1, wherein the first flow chamber and the second flow chamber are orthogonally arranged relative to one another within the single piece housing.

3. The pressure relief module of claim 1, wherein the first flow chamber is arranged adjacent to the second flow chamber within the single piece housing.

4. The pressure relief module of claim 1, wherein the first flow chamber is configured to couple to a pump outlet pipeline to receive the pressurized supply of paint.

5. The pressure relief module of claim 4, wherein the first flow chamber is configured to couple to a main spray pipeline coupled to one or more paint sprayers.

6. The pressure relief module of claim 5, wherein the second flow chamber is configured to couple to a return pipeline to receive an unpressurized return paint flow from the one or more paint sprayers.

7. The pressure relief module of claim 6, wherein the second flow chamber is configured to couple to a tank return pipeline to supply both the unpressurized return paint flow to a paint storage tank and the portion of the pressurized supply of paint diverted from the first flow chamber into the second flow chamber if the pressure of the pressurized supply of paint exceeds the threshold value.

8. A pressure relief module for a paint circulating system, comprising:
   a single piece housing, comprising:
     a first flow chamber through which pressurized paint is provided to a supply pipeline; and
     a second flow chamber through which paint returns from a return line to a tank return pipeline, wherein the first flow chamber and the second flow chamber define passageways in the single piece housing, the first flow chamber and the second flow chamber are separated by a common separating wall, and the common separating wall has an orifice that interconnects the first and second flow chambers; and
   a valve member biased towards the orifice so as to block the orifice, wherein the valve member is moveable in response to a pressure in the first flow chamber exceeding a predetermined relief pressure so as to displace the valve member to open the orifice to enable paint to flow from the first flow chamber into the second flow chamber.

9. The paint circulating system of claim 8, wherein the first flow chamber and the second flow chamber are arranged perpendicularly to one another within the single piece housing.

10. The paint circulating system of claim 8, wherein the first flow chamber and the second flow chamber are arranged parallel to one another within the single piece housing.

11. The paint circulating system of claim 8, wherein the first flow chamber is arranged adjacent to the second flow chamber within the single piece housing.

12. The paint circulating system of claim 8, further comprising a tank for storing paint for supply to the paint circulating system and a pump for pumping paint from the tank such that the tank return pipeline returns paint to the tank.

13. The paint circulating system of claim 8, further comprising a valve spring biasing the valve member towards a valve seat of the orifice.

14. A method of relieving pressure in a paint circulating system comprising:
   flowing paint through a pressure relief module, wherein the pressure relief module comprises a single piece housing having a first flow chamber and a second flow chamber, the first flow chamber and the second flow chamber define passageways in the single piece housing, and the first flow chamber and the second flow chamber are separated by a common separating wall, the common separating wall having an orifice that interconnects the first and second flow chambers, and the pressure relief module comprises a valve member biased by a biasing force towards the orifice so as to block the orifice;
   supplying pressurized paint through the first flow chamber;
   causing an increase in a pressure of the pressurized paint in the first flow chamber that overcomes the biasing force causing the valve member to lift away from the orifice thereby enabling the pressurized paint to flow from the first chamber into the second chamber.

15. The method of claim 14, wherein the first flow chamber and the second flow chamber are arranged perpendicular to one another within the single piece housing.

16. The method of claim 14, wherein the first flow chamber and the second flow chamber are arranged parallel to one another within the single piece housing.

17. The method of claim 14, wherein the first flow chamber is arranged adjacent to the second flow chamber within the single piece housing.

18. The method of claim 14, wherein the pressure relief module comprises a valve spring applying the biasing force to bias the valve member towards the orifice.

19. The method of claim 14, comprising flowing an unpressurized flow through the second chamber.

* * * * *